US007391343B2

(12) United States Patent
Ito

(10) Patent No.: US 7,391,343 B2
(45) Date of Patent: Jun. 24, 2008

(54) INPUT DEVICE

(75) Inventor: Kazunari Ito, Neyagawa (JP)

(73) Assignee: ONKYO Corporation, Neyagawa (JP)

( * ) Notice: Subject to any disclaimer, the term of this patent is extended or adjusted under 35 U.S.C. 154(b) by 604 days.

(21) Appl. No.: 11/064,475

(22) Filed: Feb. 23, 2005

(65) Prior Publication Data

US 2005/0210303 A1 Sep. 22, 2005

(30) Foreign Application Priority Data

Mar. 16, 2004 (JP) ............................ 2004-073738

(51) Int. Cl.
*H03M 11/00* (2006.01)

(52) U.S. Cl. ............................ 341/22; 341/26; 345/173

(58) Field of Classification Search .................. 341/20, 341/22, 26; 345/173; 455/550
See application file for complete search history.

(56) References Cited

U.S. PATENT DOCUMENTS 6,504,492 B1 * 1/2003 Muurinen .................... 341/22
6,784,810 B2 * 8/2004 Falik et al. .................... 341/26
2003/0144023 A1 * 7/2003 Woods et al. ............... 455/550

FOREIGN PATENT DOCUMENTS

| | | |
|---|---|---|
| JP | 05-053706 | 3/1993 |
| JP | 07-013671 | 1/1995 |
| JP | 09-198169 | 7/1997 |
| JP | 2001-014073 | 1/2001 |
| JP | 2001-186657 | 6/2001 |
| JP | 2003-051960 | 2/2003 |

* cited by examiner

*Primary Examiner*—Albert K Wong
(74) *Attorney, Agent, or Firm*—Renner, Otto, Boisselle & Sklar, LLP

(57) ABSTRACT

An input device includes an input circuit including a plurality of key switches connected in parallel to one another, and a control circuit including a key input terminal to which a first terminal of the input circuit is connected, and an interrupt terminal to which a second terminal of the input circuit is connected. When a key switch is turned ON, an interrupt signal is input from the second terminal of the input circuit to the interrupt terminal, whereby the control circuit transitions from a power saving mode to a normal mode. Then, the control circuit determines which one of the key switches is turned ON based on a value of a voltage applied from the first terminal of the input circuit to the key input terminal. Thus, it is possible to realize a power saving mode without having to provide a comparator.

3 Claims, 5 Drawing Sheets

INPUT DEVICE

BACKGROUND OF THE INVENTION

1. Field of the Invention

The present invention relates to an input device, and more particularly to an input device operable in a power saving mode in which a microcomputer is shut down in a standby state.

2. Description of the Related Art

An electronic device such as an AV device has an operation state, called a "standby state", where power is supplied only to the microcomputer and to the peripheral circuits thereof so that the power of the device can be turned back ON in response to a user's operation of a key or a remote control even when the power of the device is OFF. Recently, there is a demand for further reducing the standby power consumption, i.e., the amount of power to be consumed in a standby state. In view of such a demand, the microcomputer has a power saving mode in which the microcomputer itself is shut down when the microcomputer has no process to execute. Then, in response to a user's operation of a key, an interrupt signal is input to an interrupt terminal of the microcomputer to exit the power saving mode (Japanese Patent Laid-Open No. 9-198169 and Japanese Patent Laid-Open No. 7-13671). However, Japanese Patent Laid-Open No. 9-198169 requires the provision of an OR circuit and a general-purpose input terminal for each key switch, thereby complicating the circuit configuration. In Japanese Patent Laid-Open No. 7-13671, various keys of a key matrix are scanned repeatedly so as to detect a valid key input from the key matrix. However, the scanning signal is a cause of noise, and such a configuration is inappropriate particularly in AV applications.

FIG. 5 shows a conventional circuit 501 with which a microcomputer 2 can determine which one of a plurality of key switches connected in parallel is turned ON with a single key input terminal a. With the circuit 501, when a key switch S2 is turned ON, for example, a voltage of V1×R2/(R1+R2) is input to the key input terminal a of the microcomputer 2. The input voltage is A/D-converted and compared with predetermined voltage values associated with key switches S1 to S5 so that the microcomputer 2 can determine that the key switch S2 has been pressed.

In order to provide the microcomputer 2 of the circuit 501 with a power saving mode, it is necessary to provide a comparator 505 for the transition from the power saving mode to the normal mode. The voltage at the node A is input to one end of the comparator 505, and a reference voltage is input to the other end of the comparator 505. When a key switch is turned ON, the comparator 505 applies an interrupt signal (a low-level voltage) to an interrupt terminal b. With the circuit 501, however, it is necessary to provide a comparator so as to be able to exit the power saving mode, thus increasing the cost. In order to solve the problem, Japanese Patent Laid-Open No. 2001-186657 discloses a method in which the microcomputer is operated intermittently using a built-in timer function in a standby state, and the A/D converter is operated periodically, so as to determine which key switch is turned ON. This method eliminates the need for a comparator. However, since the microcomputer is operated intermittently in a standby state, the standby power consumption cannot be reduced sufficiently.

SUMMARY OF THE INVENTION

It is therefore an object of the present invention to provide an input device capable of determining which key switch is turned ON based on the value of the voltage input to the key input terminal of the microcomputer, wherein the microcomputer is operable in a power saving mode without having to provide a comparator and without wasting power by intermittently operating the microcomputer.

An input device of the present invention includes: an input circuit including a plurality of key switches; and a control circuit including a key input terminal to which a first terminal of the input circuit is connected, and an interrupt terminal to which a second terminal of the input circuit is connected, wherein when a key switch is turned ON, an interrupt signal is input from the second terminal of the input circuit to the interrupt terminal, whereby the control circuit transitions from a power saving mode to a normal mode, and the control circuit determines which one of the key switches is turned ON based on a value of a voltage applied from the first terminal of the input circuit to the key input terminal.

With the second terminal of the input circuit, which is different from the first terminal of the input circuit, being connected to the interrupt terminal, the control circuit can transition from the power saving mode to the normal mode without using a comparator. This is because an interrupt signal is output from the second terminal of the input circuit when a key switch is turned ON.

In a preferred embodiment, the first terminal is at a predetermined voltage when the key switches are all OFF and at a voltage lower than the predetermined voltage when a key switch is ON; and the second terminal is at the predetermined voltage when the key switches are all OFF and at a low-level voltage being the interrupt signal when a key switch is ON.

When no key switch is being ON, the predetermined voltage is applied from the first terminal of the input circuit to the key input terminal, and the predetermined voltage (high level) is applied from the second terminal of the input circuit to the interrupt terminal. Therefore, the control circuit stays in the power saving mode. When a key switch is turned ON, the interrupt signal (low level) is applied from the second terminal of the input circuit to the interrupt terminal, whereby the control circuit can transition from the power saving mode to the normal mode. Moreover, a voltage associated with the key switch being ON is applied from the first terminal of the input circuit to the key input terminal, whereby the control circuit can determine which key switch is being ON and perform an operation associated with the key switch.

In a preferred embodiment, the input circuit includes a plurality of voltage determination circuits connected in series with one another, each voltage determination circuit including a resistor and a key switch; the first terminal is a connection node between the resistor and the key switch of a first voltage determination circuit, the first voltage determination circuit being one of the voltage determination circuits that is connected directly to an external power supply; and the second terminal is a connection node between the resistor and the key switch of one of the voltage determination circuits other than the first voltage determination circuit.

The connection node between the resistor and the key switch of the first voltage determination circuit is at the external power supply voltage when the key switches are all OFF, and when a key switch is turned ON, the connection node is at a voltage value associated with the key switch. The connection node between the resistor and the key switch of each of the voltage determination circuits other than the first voltage determination circuit is at the external power supply voltage (high level) when the key switches are all OFF, and is at a low-level voltage when a key switch is ON. Therefore, when a key switch is turned ON, the control circuit can transition from the power saving mode to the normal mode.

In a preferred embodiment, the second terminal is a connection node between the resistor and the key switch of a last voltage determination circuit, the last voltage determination circuit being one of the voltage determination circuits that is electrically farthest away from the external power supply.

With the connection node between the resistor and the key switch of the last voltage determination circuit being connected to the interrupt terminal, the connection node will be at a low-level voltage no matter which key switch is turned ON. Therefore, the control circuit can transition from the power saving mode to the normal mode irrespective of which key switch is turned ON.

In a preferred embodiment, an impedance of the interrupt terminal is higher than a combined impedance of the resistors of the input circuit.

By setting the impedance of the interrupt terminal to be higher than the combined impedance of the input circuit, the voltage drop through the resistors of the input circuit can be made very small. Since the voltage drop through the resistors can be made small, when no key switch is being ON, a predetermined voltage can be applied to the key input terminal without a decrease in the predetermined voltage. Therefore, it is possible to prevent the control circuit from erroneously detecting a key switch activation when no key switch is being ON. Moreover, since the voltage drop through the resistors can be made small, it is possible to reduce the amount of power to be consumed through the resistors.

In a preferred embodiment, if a key switch that is determined to be ON is a non-mode-change key switch, the control circuit transitions from the power saving mode to the normal mode and then transitions back from the normal mode to the power saving mode without performing an operation associated with the key switch.

Therefore, if a non-mode-change key switch is turned ON while the control circuit is in the power saving mode, the control circuit once transitions to the normal mode but immediately transitions back to the power saving mode. Therefore, it is possible to further reduce the standby power consumption.

In a preferred embodiment, a plurality of input circuits are provided in parallel to one another; the first terminal of each input circuit is connected to an associated key input terminal of the control circuit; the second terminal of each input circuit is connected to an input terminal of an AND circuit; and an output terminal of the AND circuit is connected to the interrupt terminal.

Therefore, with a circuit configuration in which a plurality of input circuits are connected to a plurality of key input terminals, the control circuit can transition from the power saving mode to the normal mode, irrespective of which key switch is turned ON, using a single interrupt terminal with the provision of an AND circuit.

In a preferred embodiment, the key switches of the voltage determination circuits that are subsequent to the second terminal are all non-mode-change key switches.

In a preferred embodiment, the key switches of the voltage determination circuits that precede the second terminal are all mode-change key switches.

DETAILED DESCRIPTION OF THE PREFERRED EMBODIMENTS

Figure 1:
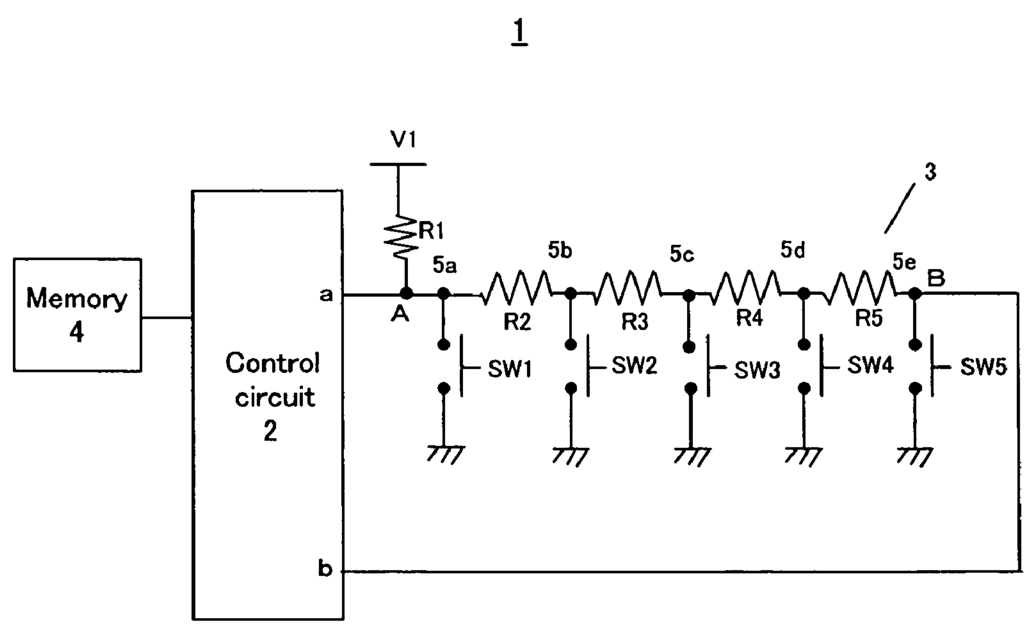
FIG. 1 is a schematic circuit diagram showing a key input device according to a preferred embodiment of the present invention.

Preferred embodiments of the present invention will now be described with reference to the drawings. The present invention is not limited to these embodiments. FIG. 1 is a schematic circuit diagram showing an input device 1 according to a preferred embodiment of the present invention. The input device 1 is a circuit for A/D-converting the voltage input to the microcomputer to determine which key switch is turned ON, and includes a control circuit 2 and an input circuit 3. A device to which the input device 1 is applicable is operable in a standby state in which power is supplied only to the microcomputer and the peripheral circuits thereof so that the power of the device can be turned back ON in response to a user's operation of a key.

The control circuit 2 controls the operation of an electronic device (e.g., a CD player) to which the input device 1 of the present embodiment is applicable, and is typically a microcomputer. The microcomputer 2 is connected to a memory 4 (e.g., a ROM and/or a RAM) via a bus, or the like, and executes various programs stored in the memory 4 to control various operations (e.g., bringing a CD player to a play mode). The microcomputer 2 has two modes of operation, i.e., a normal mode and a power saving mode. Typically, the normal mode is where the microcomputer 2 is operable. The power saving mode is where the device as a whole is in a standby state with the microcomputer 2 being shut down (e.g., generating or supplying no clock signal to the microcomputer 2) or throttled down by lowering the frequency of the clock signal supplied to the microcomputer 2 so as to further reduce the power consumption.

The microcomputer 2 includes the key input terminal a and the interrupt terminal b. The key input terminal a is a terminal receiving a voltage that is used for determining the key switch being ON. The key input terminal a is receiving a voltage from the input circuit 3, and the value of the input voltage changes when any one of the key switches is turned ON to a value less than a predetermined voltage value associated with the key switch being ON. The microcomputer 2 performs an A/D (analog/digital) conversion operation on the voltage being input to the key input terminal a, and compares the obtained value with a predetermined voltage value associated with each key switch, thereby determining which key switch is being ON. The interrupt terminal b is a terminal for receiving, from the input circuit 3, an interrupt signal for the transition from the power saving mode to the normal mode.

The input circuit 3 is a circuit for receiving a user's operation of a key switch and giving the microcomputer 2 an instruction accordingly. The input circuit 3 includes a plurality of voltage determination circuits 5*a* to 5*e*. Each voltage determination circuit includes a resistor and a key switch, and determines the voltage value to be given to the key input terminal as will be described later when the associated key switch is turned ON. While the number of key switches (voltage determination circuits) may vary depending on the functions and operations required for a particular device, five key switches SW1 to SW5 are provided in the present embodiment. The voltage determination circuit 5*a* ("first voltage determination circuit") includes a resistor R1 and the key switch SW1 connected to the resistor R1, and the resistor R1 is connected to an external power supply V1. In the illustrated example, the voltage determination circuit 5*a* is the first voltage determination circuit preceding all other voltage determination circuits. The voltage determination circuit 5*b* includes a resistor R2 and the key switch SW2, the voltage determination circuit 5*c* includes a resistor R3 and the key switch SW3, the voltage determination circuit 5*d* includes a resistor R4 and the key switch SW4, and the voltage determination circuit 5*e* includes a resistor R5 and the key switch SW5. In the illustrated example, the voltage determination circuit 5*e* is the last voltage determination circuit subsequent to all other voltage determination circuits. The resistors R1 to R5 are connected in series, with the resistor R1 being closest to the power supply V1 and the resistor R5 being farthest away from the power supply V1. The other terminal of each of the key switches SW1 to SW5 is grounded.

The input circuit 3 gives a signal used for determining which key switch is ON from a first terminal A to the key input terminal a. Thus, the first terminal A of the input circuit 3 is connected to the key input terminal a of the microcomputer 2. The first terminal A of the input circuit 3 is a node having a predetermined voltage (the power supply voltage V1) when no key switch is ON (i.e., when the key switches are all OFF). When a key switch is turned ON, the voltage at the first terminal A becomes less than a predetermined voltage V1 that is associated with the key switch being ON. Thus, the first terminal A of the input circuit 3 is a node connected to the key switch SW1 that is electrically closest to the power supply V1 among the key switches SW1 to SW5. In other words, the first terminal A of the input circuit 3 is the connection node between the resistor R1 and the key switch SW1 of the first voltage determination circuit 5*a*, which is connected directly to the power supply V1.

The input circuit 3 also gives an interrupt signal from a second terminal B thereof to the interrupt terminal b when a key switch is turned ON. Thus, the second terminal B of the input circuit 3 is connected to the interrupt terminal b of the microcomputer 2. The interrupt signal is typically a low-level (0 V) voltage. Thus, the interrupt terminal b receives two different voltages (the high-level voltage (V1) and the low-level voltage (0 V)), and the microcomputer 2 detects the low-level voltage as an interrupt signal. The second terminal B of the input circuit 3 is a node having the power supply voltage V1 (high level) when no key switch is ON (i.e., when the key switches are all OFF). When a key switch is turned ON, the voltage at the second terminal B becomes 0 V (low level). Thus, the second terminal B of the input circuit 3 is one of the resistor-switch connection nodes of the voltage determination circuits 5*b* to 5*e*, i.e., the voltage determination circuits other than the first voltage determination circuit 5*a*. Preferably, the second terminal B of the input circuit 3 is the node connected to the key switch SW5, which is electrically farthest away from the power supply V1 (i.e., the first terminal A) among the key switches SW1 to SW5 (i.e., the connection node between the resistor R5 and the key switch SW5 of the last voltage determination circuit 5*e*). Then, no matter which one of the key switches SW1 to SW5 is turned ON, the voltage at the second terminal B is brought to the low level. Thus, it is possible to give an interrupt signal to the interrupt terminal b irrespective of which key switch is turned ON.

Since the second terminal B is connected to the interrupt terminal b, the input device 1 of the present embodiment can transition from the power saving mode to the normal mode without having to provide a comparator. More specifically, when the key switches are all OFF, the voltage at the second terminal B is V1, whereby the voltage V1 (high level) is applied to the interrupt terminal b. Therefore, the microcomputer 2 stays in the power saving mode. When a key switch is turned ON, the second terminal B is grounded via the key switch being turned ON. Therefore, the voltage at the second terminal B is 0 V, whereby the voltage of 0 V (low level), being an interrupt signal, is applied to the interrupt terminal b. Thus, when a key switch is turned ON while the microcomputer 2 is in the power saving mode, an interrupt signal is input to the interrupt terminal b, thereby transitioning to the normal mode. Cases where the second terminal B of the input circuit 3 is a node connected to one of the key switches SW2 to SW4 other than the key switch SW5 will be described later along with the conditions applicable thereto.

Preferably, the impedance (resistance value) at the interrupt terminal b is higher than the combined impedance of the resistors R1 to R5 of the input circuit 3 (the combined resistance R1+R2+R3+R4+R5). The impedance at the interrupt terminal b as used herein is the impedance of device elements such as transistors provided inside the microcomputer 2 connected to the interrupt terminal b. For example, the impedance at the interrupt terminal b is about 10 to 50 times that of the input circuit 3. For example, the impedance at the interrupt terminal b is about 200 to 1000 kilohms, and the combined impedance of the input circuit 3 is about 20 to 50 kilohms. If the impedance at the interrupt terminal b is lower than the combined impedance of the input circuit 3, there will be a substantial voltage drop through the resistors R1 to R5 when a current flows from the power supply V1 to the interrupt terminal b via the resistors R1 to R5 with all the key switches being OFF. Due to the voltage drop through the resistors R1 to R5, the microcomputer 2 may erroneously detect a key switch activation with a voltage less than V1 being input to the key input terminal a even though no key switch is being pressed. Moreover, a large voltage drop through the resistors R1 to R5 increases the amount of power to be consumed through the resistors R1 to R5, resulting in a waste of power. With the present invention, however, the impedance of the interrupt terminal b is set to be higher than the combined impedance of the input circuit 3, thereby reducing the voltage drop through the resistors R1 to R5 to a negligible level. Therefore, when no key switch is ON, the voltage V1, as it is, is input to the key input terminal a, thus preventing the erroneous detection by the microcomputer 2. Moreover, it is possible to reduce the amount of power to be consumed through the resistors R1 to R5.

Figure 2:
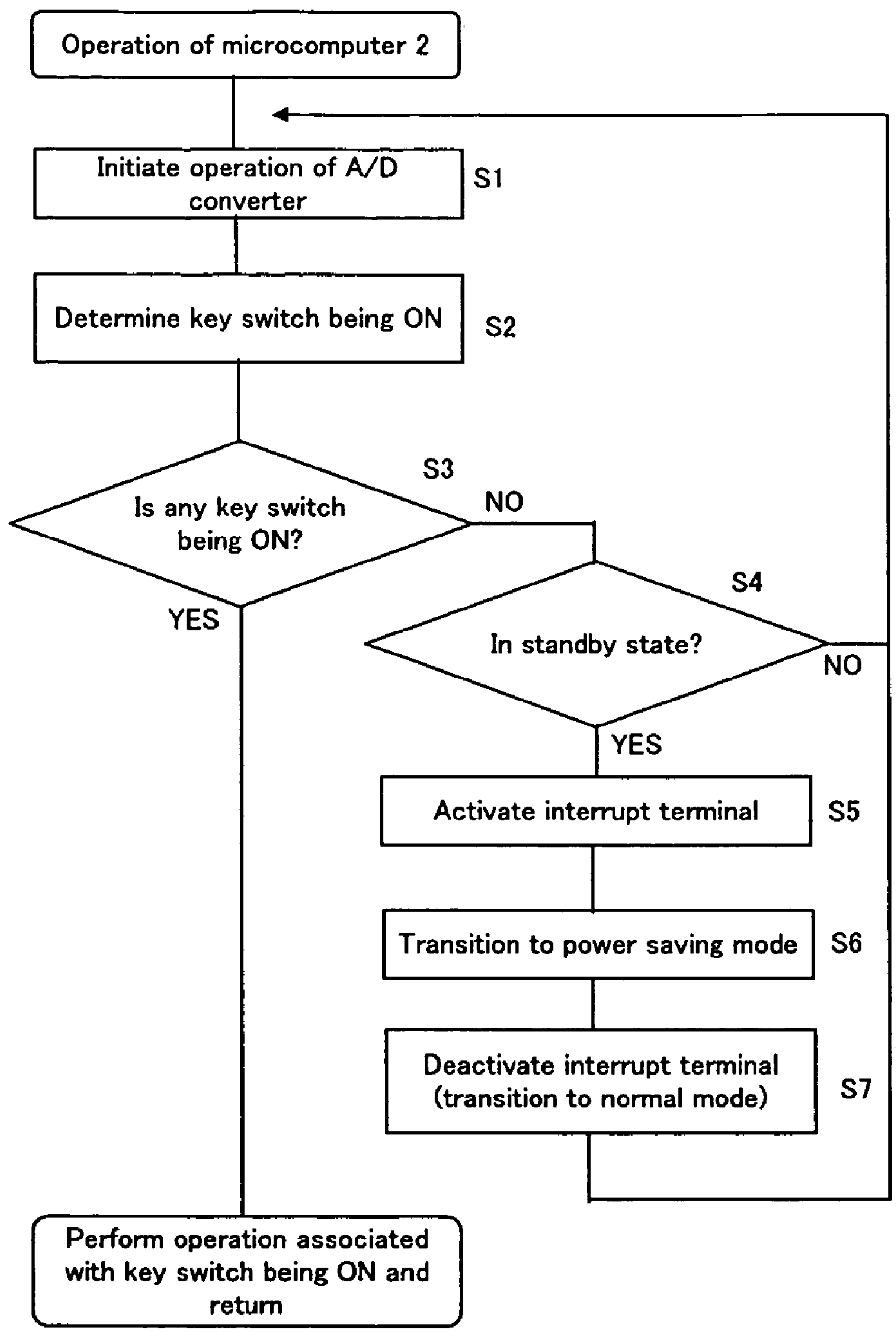
FIG. 2 is a flow chart showing an operation of a key input device according to a preferred embodiment of the present invention.

Next, the operation of the microcomputer 2 in the input device 1 will be described with reference to the flow chart of FIG. 2. When the microcomputer 2 is in the normal mode, the microcomputer 2 initiates the operation of the A/D converter in step S1. Specifically, when a voltage is input to the key input terminal a, the analog value of the input voltage is converted to a digital value. In steps S2 and S3, based on the obtained voltage value, which key switch is being ON is determined (or it is determined that no key switch is being ON). For example, when the key switch SW3 is turned ON, a voltage of V1×(R2+R3)/(R1+R2+R3) is input to the key input terminal a, and the key switch SW3 being ON is detected based on the digital value of the voltage (YES in step S3). Then, the microcomputer 2 performs an operation associated with the key switch SW3 and returns.

When the voltage V1 is input to the key input terminal a and the microcomputer 2 detects the voltage V1, the microcomputer 2 determines that no key switch is being ON (NO in step S3). Then, in step S4, it is determined whether or not the device is in the standby state. If the device is in the standby state, the process proceeds to step S5, where the microcomputer 2 activates the interrupt terminal b, and the microcomputer 2 then transitions to the power saving mode in step S6. Then, the microcomputer 2 stays in the power saving mode (S6) until any key switch is turned ON and an interrupt signal is input to the interrupt terminal b.

In the power saving mode, when a key switch is turned ON and an interrupt signal is input to the interrupt terminal b, the process proceeds to step S7, where the microcomputer 2 transitions from the power saving mode to the normal mode, deactivates the interrupt terminal b, and returns to step S1. Thereafter, the microcomputer 2 performs an operation associated with a key switch turned ON via steps S1 to S3. As described above, if no key switch is turned ON in the standby state, the microcomputer 2 transitions to the power saving mode, and back to the normal mode if a key switch is turned ON thereafter.

Next, another preferred embodiment of the present invention will be described. In this embodiment, if the user presses a key switch other than the power switch in the power saving mode, the microcomputer 2 once transitions to the normal mode but then transitions back to the power saving mode without turning ON the power of the device and without performing an operation associated with the key switch pressed by the user, thus further reducing the power consumption. Specifically, the input circuit 3 includes two types of key switches, i.e., mode-change key switches (e.g., the switches SW1 to SW4 as shown in FIG. 1) and non-mode-change key switches (e.g., the switch SW5 as shown in FIG. 1). When a mode-change key switch is turned ON, the microcomputer 2 transitions from the power saving mode to the normal mode and performs an operation associated with the key switch. A mode-change key switch may be, for example, a power key switch, a "Standby/ON" key switch, "Open/Close" key switch, or "Play" key switch. When a non-mode-change key switch is turned ON, the microcomputer 2 once transitions from the power saving mode to the normal mode but then transitions back to the power saving mode without performing an operation associated with the key switch. A non-mode-change key switch is a key switch that does not turn ON/OFF the power of the device, and may be, for example, a stop key switch or a skip key switch. The circuit configuration itself is the same as that of the input device 1 shown in FIG. 1, and will not be further described below.

Figure 3:
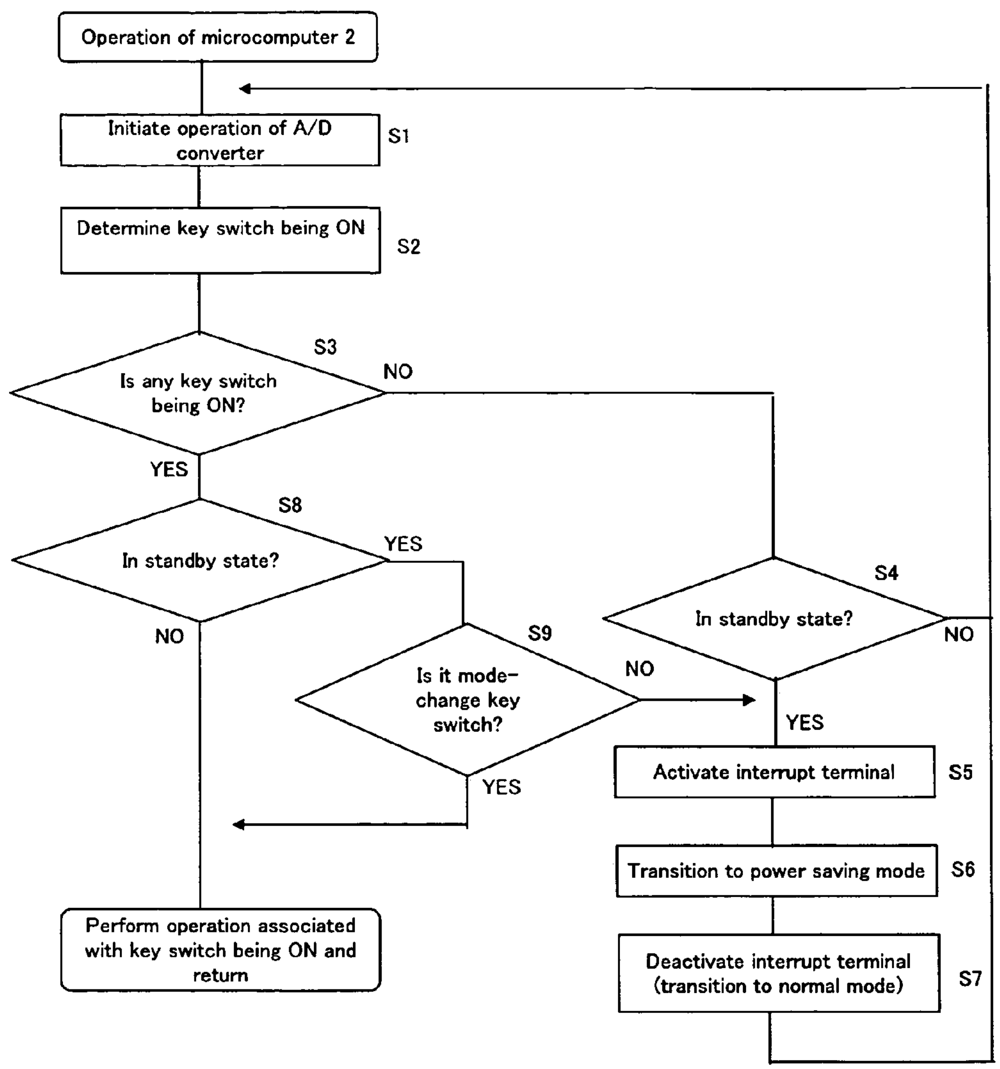
FIG. 3 is a flow chart showing an operation of a key input device according to a preferred embodiment of the present invention.

The operation according to the present embodiment will now be described with reference to FIG. 3. FIG. 3 is a flow chart showing the operation of the microcomputer 2 of the present embodiment. Like steps to those shown in FIG. 2 are denoted by like step numbers, and will not be further described below. When a key switch is turned ON in the power saving mode, the microcomputer 2 transitions to the normal mode in step S7 and determines the key switch being ON in steps S1 and S2. The microcomputer 2 determines that a key switch is ON in step S3, and then determines in step S8 whether or not the device is in the standby state. If the device is in the standby state (YES in step S8), the microcomputer 2 determines in step S9 whether or not the key switch being ON is a mode-change key switch. If the key switch is not a mode-change key switch (e.g., if it is a stop key switch) (NO in step S9), the microcomputer 2 transitions back from the normal mode to the power saving mode in steps S5 and S6. If the microcomputer 2 determines in step S8 that the device is not in the standby state, meaning that a key switch has been pressed while the device is in a power-ON state, the microcomputer 2 performs an operation associated with the key switch being ON. If the microcomputer 2 determines in step S9 that the key switch being ON is a mode-change key switch, the microcomputer 2 performs an operation associated with the mode-change key switch (e.g., the operation of transitioning from the standby state to the power-ON state).

As described above, in the present embodiment, when the user presses a non-mode-change key switch such as a stop key in the power saving mode, the microcomputer 2 once transitions to the normal mode but immediately transitions back to the power saving mode, thereby further reducing the power consumption. Referring to FIG. 1, if the switches SW1 to SW4 are mode-change key switches and the switch SW5 is a non-mode-change key switch, the second terminal B of the input circuit 3 can be the node connected to the key switch SW4 (i.e., the connection node between the resistor R4 and the key switch SW4 can be connected to the interrupt terminal b). Then, a low-level voltage being an interrupt signal can be input to the interrupt terminal b when one of the key switches SW1 to SW4 is turned ON. When the key switch SW5 is turned ON, an interrupt signal cannot be input. In the present embodiment, however, the key switch SW5 is a non-mode-change key switch. Therefore, not being able to input an interrupt signal with this key switch will not be a problem in the present embodiment. If the resistance value of the resistor R5 is set to be substantially higher than those of the other resistors R1 to R4, a voltage generally equal to the voltage V1 (i.e., a high-level voltage) can be input to the interrupt terminal b when the key switch SW5 is turned ON. Thus, the microcomputer 2 will not malfunction if the resistance values of the resistors are adjusted appropriately.

Figure 4:
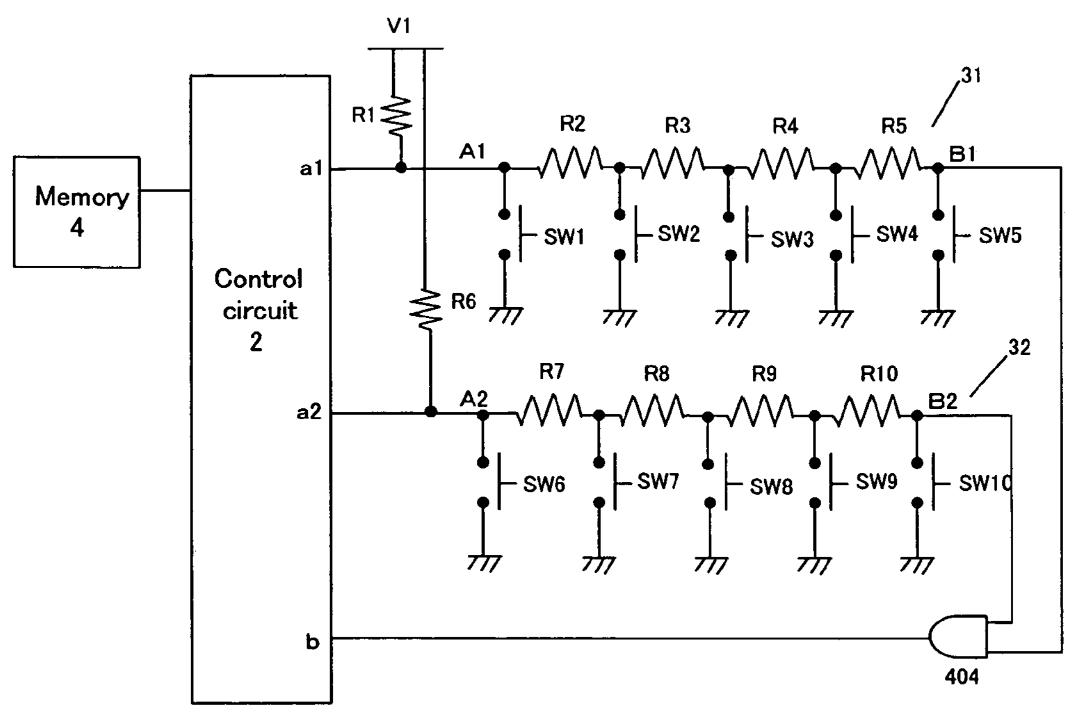
FIG. 4 is a schematic circuit diagram showing a key input device according to another preferred embodiment of the present invention.
Figure 5:
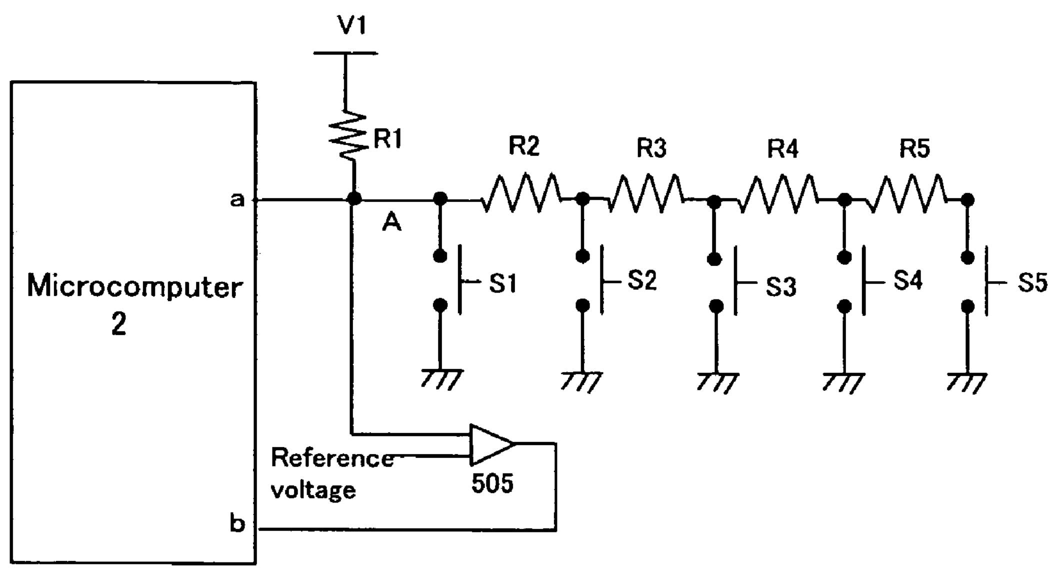
FIG. 5 is a circuit diagram showing a conventional key input device.

Next, an input device 401 according to still another preferred embodiment of the present invention will be described. FIG. 4 is a schematic circuit diagram showing the input device 401. The input device 401 includes a plurality of (two in the illustrated example) input circuits connected in parallel with each other. First ends A1 and A2 of input circuits 31 and 32 are connected to key input terminals a1 and a2, respectively. Second ends B1 and B2 of the input circuits 31 and 32 are connected to input terminals of an AND circuit 404, and the output terminal of the AND circuit 404 is connected to the interrupt terminal b. The configuration of each of the input circuits 31 and 32 is the same as that of the input circuit 3 shown in FIG. 1, and will not be further described below.

For example, when a key switch SW8 of the input device 401 is turned ON in the power saving mode, the second end B2 of the input circuit 32 transitions to the low level. The AND circuit 404 outputs a low-level signal if at least one of the inputs thereof receives a low-level signal. Therefore, a low-level voltage being an interrupt signal is applied from the AND circuit 404 to the interrupt terminal b, and the microcomputer 2 transitions from the power saving mode to the normal mode. Also when one of the switches SW1 to SW5 of the input circuit 31 is turned ON, a low-level voltage is applied from the AND circuit 404 to the interrupt terminal b. When the key switches are all OFF, input voltages from the second ends B1 and B2 to the AND circuit 404 are both high-level voltages. Therefore, a high-level voltage is applied from the AND circuit 404 to the interrupt terminal b, and the microcomputer 2 stays in the power saving mode. As described above, even with a circuit configuration in which a plurality of input circuits are connected in parallel with one another, it is possible to transition from the power saving mode to the normal mode using a common interrupt terminal b with the provision of an AND circuit.

While preferred embodiments of the present invention have been described above, the present invention is not limited to the particular embodiments set forth above. For example, a selector switch may be provided between the input circuit 3 and the interrupt terminal b. Then, in the normal mode, the selector switch can be connected to the power supply so as to apply a constant voltage to the second terminal of the input circuit 3, and in the power saving mode, the selector switch can be connected to the interrupt terminal. Thus, in the normal mode, the second terminal of the input circuit 3 is not connected to the interrupt terminal b, and no current will flow from the power supply V1 to the interrupt terminal b via the resistors R1 to R5. If a current flows from the power supply V1 to the interrupt terminal b via the resistors R1 to R5 in the normal mode, a voltage drop occurs through the resistors R1 to R5, thus decreasing the voltage input to the key input terminal a, whereby the microcomputer 2 may erroneously detect the activation of a wrong key switch, which is not actually being ON. Such a problem is prevented with this alternative embodiment.

The present invention can suitably be used in electronic devices where a reduction in the standby power consumption is desired, particularly in AV devices such as TV sets, component audio systems, AV receivers and DVD player/recorders or in personal computers.

What is claimed is:

1. An input device, comprising:

an input circuit including a plurality of key switches; and a control circuit including a key input terminal to which a first terminal of the input circuit is connected, and an interrupt terminal to which a second terminal of the input circuit is directly connected, wherein when a key switch is turned ON, an interrupt signal is input from the second terminal of the input circuit to the interrupt terminal, so that the control circuit transitions from a power saving mode to a normal mode, and the control circuit determines which one of the key switches is turned ON based on a value of a voltage applied from the first terminal of the input circuit to the key input terminal;

the input circuit includes a plurality of voltage determination circuits connected in series with one another, each voltage determination circuit including a resistor and a key switch;

the first terminal is a connection node between the resistor and the key switch of a first voltage determination circuit, the first voltage determination circuit being one of the voltage determination circuits that is connected directly to an external power supply;

the second terminal is a connection node between the resistor and the key switch of one of the voltage determination circuits other than the first voltage determination circuit and a last voltage determination circuit, the last voltage determination circuit being one of the voltage determination circuits that is electrically farthest away from the external power supply;

the key switches of the voltage determination circuits that are subsequent to the second terminal are all non-mode-change key switches and if the non-mode-change key switch is turned ON, the interrupt signal is not input to the interrupt terminal; and the key switches of the voltage determination circuits that precede the second terminal are all mode-change key switches and if the mode-change key switch is turned ON, the interrupt signal is input to the interrupt terminal.

2. An input device according to claim 1, wherein:

the first terminal is at a predetermined voltage when the key switches are all OFF and at a voltage lower than the predetermined voltage when a key switch is ON; and the second terminal is at the predetermined voltage when the key switches are all OFF or the non-mode-change key switch is ON, and at a low-level voltage being the interrupt signal when the mode-change key switch is ON.

3. An input device according to claim 1, wherein an impedance of the interrupt terminal is higher than a combined impedance of the resistors of the input circuit.

* * * * *